(12) United States Patent
Chen

(10) Patent No.: US 10,180,706 B1
(45) Date of Patent: Jan. 15, 2019

(54) MOBILE COMPUTER-BASED HOST

(71) Applicant: IBASE TECHNOLOGY INC., Taipei (TW)

(72) Inventor: You-Nan Chen, Taipei (TW)

(73) Assignee: IBASE TECHNOLOGY INC., Taipei (TW)

( * ) Notice: Subject to any disclaimer, the term of this patent is extended or adjusted under 35 U.S.C. 154(b) by 0 days.

(21) Appl. No.: 15/873,912

(22) Filed: Jan. 18, 2018

(30) Foreign Application Priority Data

Dec. 21, 2017 (TW) .............................. 106145174 A

(51) Int. Cl.
*G06F 1/16* (2006.01)
(52) U.S. Cl.
CPC .......... *G06F 1/1656* (2013.01); *G06F 1/1632* (2013.01)
(58) Field of Classification Search
CPC ................................................... G06F 1/1632
USPC ................................................ 361/679.41
See application file for complete search history.

(56) References Cited

U.S. PATENT DOCUMENTS

| | | | | |
|---|---|---|---|---|
| 4,530,066 A | * | 7/1985 | Ohwaki | G06F 1/1613 361/679.31 |
| 4,986,618 A | * | 1/1991 | Wakatsuki | G06K 13/08 312/276 |
| 5,227,614 A | * | 7/1993 | Danielson | G06F 1/1632 235/380 |
| 5,227,957 A | * | 7/1993 | Deters | G06F 1/181 312/223.2 |
| 5,278,730 A | * | 1/1994 | Kikinis | G06F 1/1626 361/679.32 |
| 5,325,262 A | * | 6/1994 | Ma | G06F 1/1626 345/905 |
| 5,331,509 A | * | 7/1994 | Kikinis | G06F 1/1626 361/679.33 |
| 5,468,947 A | * | 11/1995 | Danielson | G06F 1/1626 235/472.02 |
| 5,491,609 A | * | 2/1996 | Dankman | G06F 1/1626 361/679.41 |
| 5,574,625 A | * | 11/1996 | Ohgami | G06F 1/1626 312/223.2 |
| 5,600,800 A | * | 2/1997 | Kikinis | G06F 1/1626 710/303 |
| 5,640,302 A | * | 6/1997 | Kikinis | G06F 1/1616 361/679.26 |

(Continued)

*Primary Examiner* — Adrian S Wilson
(74) *Attorney, Agent, or Firm* — Lin & Associates Intellectual Property, Inc.

(57) ABSTRACT

A mobile computer-based host includes a main body, at least one multifunctional module, and at least one lid. Each multifunctional module has the same size and shape. The main body includes a case and a host module, and the case encloses the host module and includes at least one module slot, each having the same size and shape for accommodating the multifunctional module. The lid covers the corresponding module slot to isolate and protect the multifunctional module. The module slots of the present invention are allowed to install the various multifunctional modules to provide different and specific functions without changing the original design of the size and shape. Thus, the application field of the mobile computer-based host is widely expanded to meet various demands in the future, and the lifetime is greatly prolonged without wasting any precious resource, thereby achieving the goal of environmental protection.

4 Claims, 2 Drawing Sheets

(56) References Cited

U.S. PATENT DOCUMENTS

| | | | | |
|---|---|---|---|---|
| 5,661,634 A * | 8/1997 | Obata | G06F 1/1626 | 361/679.02 |
| 5,825,617 A * | 10/1998 | Kochis | G06F 1/1626 | 361/679.43 |
| 6,115,242 A * | 9/2000 | Lambrecht | G06F 1/20 | 257/686 |
| 6,353,535 B1 * | 3/2002 | Yoshida | G06F 1/1616 | 312/223.2 |
| 6,910,632 B2 * | 6/2005 | Koenck | B60R 11/02 | 235/462.45 |
| 7,221,961 B1 * | 5/2007 | Fukumoto | G06F 1/1616 | 455/41.2 |
| 8,040,671 B2 * | 10/2011 | Iwamoto | G06F 1/1616 | 361/679.26 |
| 2005/0185364 A1 * | 8/2005 | Bell | G06F 1/1632 | 361/679.41 |
| 2007/0033297 A1 * | 2/2007 | Hsu | G06F 1/1605 | 710/1 |
| 2012/0137024 A1 * | 5/2012 | Kim | G06F 1/1616 | 710/8 |
| 2013/0080670 A1 * | 3/2013 | Medica | G06F 1/1626 | 710/110 |
| 2016/0306384 A1 * | 10/2016 | Carvey | G06F 1/1632 | |

* cited by examiner

and electronic features without any change or violation of the original outlook, obviously expanding the field of the future application, prolonging the lifetime of the mobile computer-based host, and achieving the goal of re-use and environment protection without wasting any precious resources so as to overcome the drawbacks in the prior arts.

MOBILE COMPUTER-BASED HOST

CROSS-REFERENCE TO RELATED APPLICATION

This application claims the priority of Taiwanese patent application No. 106145174, filed on Dec. 21, 2017, which is incorporated herewith by reference.

BACKGROUND OF THE INVENTION

1. Field of the Invention

The present invention generally relates to a mobile computer-based host, and more specifically to a mobile computer-based host intended to enhance and boost up the feature of modularization and multifunction by employing the modularized module slots with the same size to detachably accommodate various multifunctional modules with the same size, thereby greatly enhancing diversity of electric and electronic features without any change or violation of the original outlook, obviously expanding the field of the future application, prolonging the lifetime of the mobile computer-based host, and achieving the goal of re-use and environment protection without wasting any precious resources.

2. The Prior Arts

Traditional mobile computer-based hosts like tablet, notebook, or any portable electronic devices, often have limited built-in electric/electronic features, and are usually provided with specific slots for accommodating desired modules. For example, an additional battery module is inserted into the slot to prolong operation time. However, when other functions are needed like Wi-Fi wireless connection for reducing cost of network communication, the slot fails to accommodate the traditional Wi-Fi module and the Wi-Fi module needs to connect to an connection interface of the host such as USB port because the slot is specifically designed to accommodate the battery module instead of the Wi-Fi module with a different size.

In the prior arts, one solution to solve the above problem is to provide many module slots, each for accommodating one external module. The module slot has a specific connection interface for electrically connecting the external module. In other words, the connection interface of the battery module slot is only intended to fit the battery module, and the connection interface of the Wi-Fi module slot is only intended to fit the Wi-Fi module. Obviously, the mobile computer-based host has limited space to install the module slots, and each module slot is designed for one specific module such that any two different modules already accommodated fail to exchange each other.

Further, another shortcoming in the prior arts is that the host provided with many connection interfaces becomes large in size and not portable any more, leading to inconvenience. For instance, to prevent the module from detaching, the user is not allowed to freely move, turn, or rotate the host. Thus, it is not convenient to use in actual circumstances.

Therefore, it is greatly needed to provide a new mobile computer-based host, which enhances and boosts up the feature of modularization and multifunction by employing the modularized module slots with the same size to detachably accommodate various multifunctional modules with the same size, thereby greatly enhancing diversity of electric and electronic features without any change or violation of the original outlook, obviously expanding the field of the future application, prolonging the lifetime of the mobile computer-based host, and achieving the goal of re-use and environment protection without wasting any precious resources so as to overcome the drawbacks in the prior arts.

SUMMARY OF THE INVENTION

To overcome the problems in the prior arts, the primary objective of the present invention is to provide a mobile computer-based host comprising a main body, at least one multifunctional module, and at least one lid. The main body comprises a case and a host module. The case encloses the host module for isolation and protection, and the host module is provided with at least one module slot on a front surface or a back surface of the case.

Each module slot is provided with a connection interface, which is intended to be electrically connected to the host module.

Each multifunctional module is detachably accommodated in the corresponding one of the at least one module slot, and provided with a connection port for being electrically connected to the connection interface of the module slot.

Each lid is intended to cover the corresponding module slot so as to enclose the multifunctional module for isolation and protection.

More specifically, each module slot has the same size and shape, and each multifunctional module has the same outer shape and size to fit the size and shape of the module slot. In particular, the multifunctional module has a thickness less than a depth of the module slot, and after the at least one lid covers the at least one module slot, a smooth surface is formed by an outer surface of the at least one lid and the surface of the case.

Furthermore, the connection port of the multifunctional module is electrically connected to the corresponding connection interface.

Therefore, the present invention employs the modularized module slots with the same size to detachably accommodate various electric or electronic modules with the same size to enhance diversity without any change or violation of the original outlook. Particularly, the field of the future application is greatly expanded, and the lifetime of the mobile computer-based host is prolonged without wasting any precious resources, thereby achieving the goal of re-use and environment protection.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
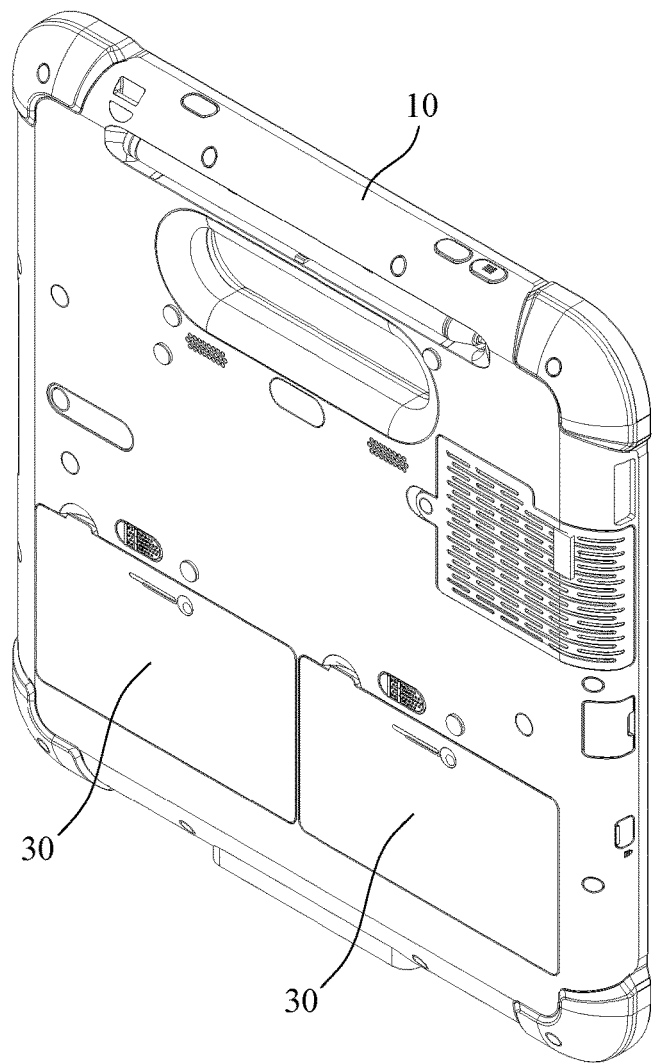
FIG. 1 is a three-dimensional view showing the mobile computer-based host according to the embodiment of the present invention.
Figure 2:
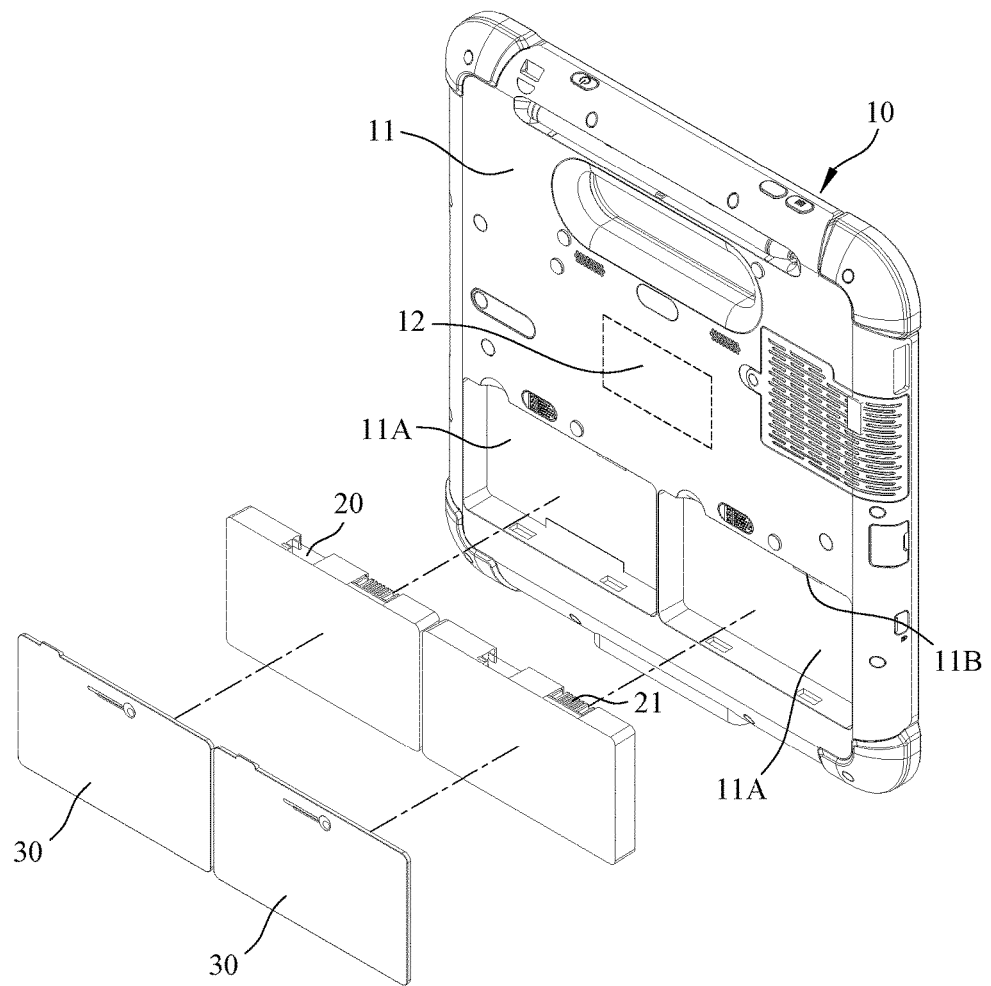
FIG. 2 is an explosion view showing the mobile computer-based host of the present invention.

Please refer to FIGS. 1 and 2 illustrating the mobile computer-based host according to the embodiment of the present invention. The mobile computer-based host of the present invention generally comprises a main body 10, at least one multifunctional module 20, and at least one lid 30. The main body 10 comprises a case 11 and a host module 12 enclosed in the case 11 for isolation and protection. Further, the case 11 comprises at least one module slot 11A provided on a front surface or a back surface of the case 11. As can be seen in FIGS. 1 and 2, the front and back surfaces are the two surfaces having a surface area larger than other surfaces of the case. It should be noted that the at least one module slot 11A on the back surface of the case 11 shown in FIG. 1 is only an illustrative example for clearly describing the aspects of the present invention, but not intended to limit the scope of the present invention.

The mobile computer-based host according to the embodiment of the present invention is a tablet computer, a notebook computer, or any portable electronic device such as portable video/audio player or a karaoke.

Moreover, the multifunctional module 20 is detachably accommodated in the module slot 11A for being electrically conned to the host module 12. The at least one lid 30 is specifically configured to cover the at least one module slot 11A for enclosing the at least one multifunctional module 20. The lid 30 is detachably fixed to the case 11 of the main body 10 by means of screws, buckles, or latches. It should be noted that the lid 30 shown in FIGS. 1 and 2 is exemplarily fixed by the buckles.

Specifically, each module slot 11A has the same size and shape, and each multifunctional module 20 has the same outer shape and size, which are intended to fit the size and shape of the module slot 11A. Particularly, the multifunctional module 20 is fully accommodated in the module slot 11A. Further, the multifunctional module 20 has a thickness less than a depth of the module slot 11A. In other words, after the at least one lid 30 covers the at least one module slot 11A, a smooth surface is formed by an outer surface of the at least one lid 30 and the surface of the case 11. For example, the module slot 11A and the multifunctional module 20 are preferably rectangular.

Moreover, the multifunctional module 20 is a 5G communication module, a sub-system module, a smart input/output (IO) module, a Wi-Fi module, or an integrated module comprising a battery and an IO interface. Thus, the same module slot 11A is capable to accommodate one different module for actual need. One feature of the above scheme is to easily expand the application field of the whole mobile computer-based host. For instance, when the maximum power capacity is needed, all the module slots 11A are installed by the battery modules, or when the mobile computer-based host is required to have a 5G communication function, one module slot 11A is selected to accommodate the 5G communication mule. Accordingly, the smart IO module and the Wi-Fi module provide high performance IO and Wi-Fi connection, respectively. As a whole. The module slot 11A is allowed to install one suitable module to implement specific function.

Furthermore, each module slot 11A is provided with a connection interface 11B, and each multifunctional module 20 has a connection port 21 intended to electrically connect the connection interface 11B. Therefore, any one multifunctional module 20 with any different electric or electronic function has the same geometrical structure and connection interface to implement modularization feature and easily accommodated in one module slot 11A. As can be seen in FIG. 2, the multifunctional module 20 is inserted into the module slot 11A in an insertion direction perpendicular to the front or back surface of the main case 11. The connection port 21 is disposed on a side surface of the multifunctional module 20 parallel to the insertion direction and the connection interface 11B is located on a side wall of the module slot 11A. It should be noted that the connection port 21 and the connection interface 11B are connected on a plane parallel to the insertion direction and perpendicular to the front or back surface.

From the above mention, the primary feature of the present invention is that all the module slots are modularized to provide with the same size and geometrical structure and allowed to detachably accommodate the different geometrical structure module so as to enhance a variety of electric features without changing or violating the original outlook. It is obvious that the field of the future application is greatly expanded, and the lifetime of the mobile computer-based host is prolonged without wasting any precious resources, thereby achieving the goal of re-use and environment protection.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A mobile computer-based host, comprising:
   a main body comprising a case and a host module, the case enclosing the host module and comprising at least one module slot, each module slot provided on a front surface or a back surface of the case, the front and back surfaces having a surface area larger than other surface areas of the case;
   at least one multifunctional module detachably accommodated in the at least one module slot, each multifunctional module having a connection port electrically connected to a connection interface of the module slot, the connection port being disposed on a side surface of the multifunctional module and the connection interface being located on a side wall of the module slot; and
   at least one lid covering the at least one module slot to isolate and protect the at least one multifunctional module,
   wherein each module slot has the same size and shape, each multifunctional module has the same outer shape and size to fit the size and shape of the module slot, the multifunctional module is inserted into or detached from an accommodation space in the module slot in a direction perpendicular to the front or back surface of the case, the connection port and the connection interface are connected on a plane parallel to the insertion direction and perpendicular to the front or back surface, and the accommodation space is not changed when the multifunctional module is accommodated in or detached from the module slot.

2. The mobile computer-based host as claimed in claim 1, wherein the multifunctional module has a thickness less than a depth of the module slot, and after the at least one lid covers the at least one module slot, a smooth surface is formed by an outer surface of the at least one lid and the front or back surface of the case.

3. The mobile computer-based host as claimed in claim 1, wherein the lid is detachably fixed to the case by means of screws, buckles, or latches.

4. The mobile computer-based host as claimed in claim 1, wherein the multifunctional module is a 5G communication module, a sub-system module, a smart input/output (IO) module, a Wi-Fi module, or an integrated module comprising a battery and an IO interface.

\* \* \* \* \*